(12) United States Patent
Saiki et al.

(10) Patent No.: US 10,033,241 B2
(45) Date of Patent: Jul. 24, 2018

(54) GENERATOR MOTOR

(71) Applicant: KOBELCO CONSTRUCTION MACHINERY CO., LTD., Hiroshima-shi (JP)

(72) Inventors: Seiji Saiki, Hiroshima (JP); Kazushige Koiwai, Hiroshima (JP); Seiichi Onishi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 185 days.

(21) Appl. No.: 15/091,069

(22) Filed: Apr. 5, 2016

(65) Prior Publication Data
US 2016/0308417 A1  Oct. 20, 2016

(30) Foreign Application Priority Data
Apr. 16, 2015 (JP) ................. 2015-084246

(51) Int. Cl.
| | |
|---|---|
| *H02K 5/04* | (2006.01) |
| *H02K 5/10* | (2006.01) |
| *H02K 11/25* | (2016.01) |
| *H02K 5/22* | (2006.01) |

(52) U.S. Cl.
CPC ........... *H02K 5/04* (2013.01); *H02K 5/10* (2013.01); *H02K 5/225* (2013.01); *H02K 11/25* (2016.01); *B60L 2200/40* (2013.01); *B60L 2220/50* (2013.01); *H02K 2205/09* (2013.01)

(58) Field of Classification Search
CPC .... H02K 2205/09; B60L 1/00; B60L 2200/40
USPC ........................................ 310/71
See application file for complete search history.

(56) References Cited

U.S. PATENT DOCUMENTS

| | | | | |
|---|---|---|---|---|
| 4,945,270 A | * | 7/1990 | Okamoto | ........... F02N 15/00 29/596 |
| 2004/0098983 A1 | * | 5/2004 | Naruse | ............... E02F 3/325 60/428 |
| 2013/0134807 A1 | | 5/2013 | Murata et al. | |

FOREIGN PATENT DOCUMENTS

| | | | | |
|---|---|---|---|---|
| EP | 2626980 | * | 2/2012 | ........... H02K 5/10 |
| JP | 11-168849 A | | 6/1999 | |
| JP | 2012-213281 | | 11/2012 | |

OTHER PUBLICATIONS

Extended European Search Report dated Aug. 25, 2016 in European Patent Application No. 16164609.6.

* cited by examiner

*Primary Examiner* — Terrance Kenerly
(74) *Attorney, Agent, or Firm* — Oblon, McClelland, Maier & Neustadt, L.L.P.

(57) ABSTRACT

A generator motor includes a stator, a rotor that rotates relative to the stator, and a motor housing that houses the stator and the rotor. The motor housing includes a housing main body that encloses a periphery of the stator and the rotor and a cover that is attached to an end surface of the housing main body so as to cover an opening formed on the end surface, which is on an opposite side to an engine, of the housing main body. A drain hole for draining water inside the motor housing to below the motor housing is formed between a lower end of the cover and the end surface of the housing main body. The motor housing includes a covered section that covers the drain hole from below at a position that is lower than the drain hole.

3 Claims, 8 Drawing Sheets

LEFT ← → RIGHT

FRONT ←→ REAR

LEFT ←⎯→ RIGHT

LEFT ←⎯→ RIGHT

GENERATOR MOTOR

TECHNICAL FIELD

The present invention relates to a generator motor attached to an engine of a construction machine.

BACKGROUND ART

As an example of such construction machines, a hybrid construction machine described in Japanese Unexamined Patent Publication No. 2012-213281 is known.

The hybrid construction machine includes an engine, a generator motor connected to an output shaft of the engine, and a hydraulic pump connected to the output shaft of the engine via the generator motor.

The generator motor operates as a power generator using power from the engine and also operates as a motor when electric power from an electric power source such as an electric power storage device is supplied thereto to assist the engine.

Specifically, the generator motor includes a stator, a rotor which rotates relative to the stator, and a housing which houses the stator and the rotor.

The housing includes a housing main body (a pump-side housing) which encloses a periphery of the stator and the rotor and a cover (a supporting member) which is attached to an end surface of the housing main body so as to cover an opening formed on an end surface on an opposite side to the engine (a hydraulic pump side) of the housing main body.

As described earlier, the generator motor internally generates electric power and also supplies electric power to and receives electric power from a power storage device or the like. Therefore, when water exists in the housing of the generator motor, a failure such as a short-circuit of an electric circuit provided inside the generator motor and corrosion of components of the generator motor may occur.

In particular, since the rotor and the stator generate heat during activation of the generator motor, a temperature difference may arise between the temperature inside the housing and the temperature outside the housing. When dew condensation occurs inside the housing due to the temperature difference, water created by the dew condensation may cause a failure in the generator motor.

SUMMARY OF INVENTION

An object of the present invention is to provide a generator motor capable of draining water inside a housing to the outside of the housing.

In order to solve the problem described above, the present invention provides a generator motor to be attached to an engine of a construction machine, the generator motor including: a stator; a rotor that rotates relative to the stator; and a housing that houses the stator and the rotor, wherein the housing includes a housing main body that encloses a periphery of the stator and the rotor and a cover that is attached to an end surface of the housing main body so as to cover an opening formed on the end surface, which is on an opposite side to the engine, of the housing main body, a drain hole for draining water inside the housing to below the housing is formed between a lower end of the cover and the end surface of the housing main body, and the housing includes a covered section that covers the drain hole from below at a position lower than the drain hole.

According to the present invention, water inside a housing can be drained to the outside of the housing.

DESCRIPTION OF EMBODIMENTS

Hereinafter, embodiments of the present invention will be described with reference to the accompanying drawings. It is to be understood that the following embodiments are merely examples embodying the present invention and are not intended to limit the technical scope of the present invention.

First Embodiment (FIGS. 1 to 7)

Figure 1:
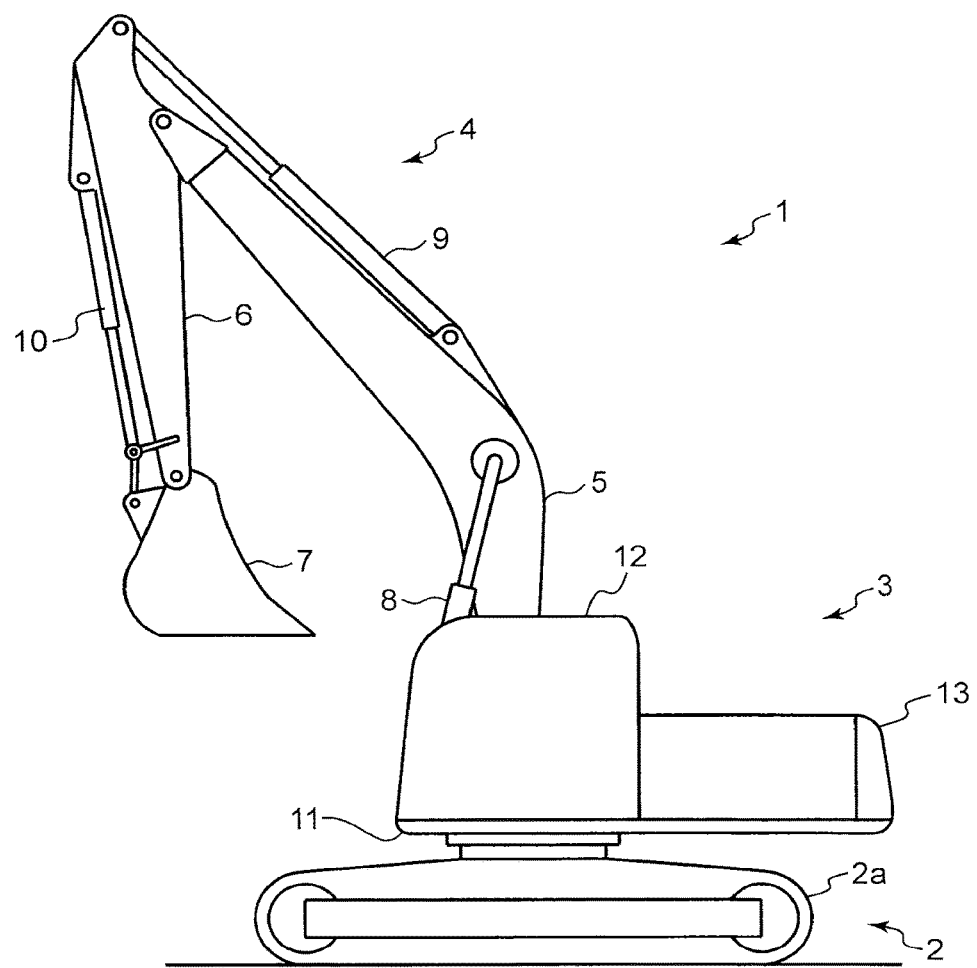
FIG. 1 is a side view showing an overall configuration of a hybrid shovel according to a first embodiment of the present invention.

Referring to FIG. 1, a hybrid shovel 1 as an example of the construction machine according to the present invention includes a lower traveling body 2 with a crawler 2a, an upper slewing body 3 rotatably provided on the lower traveling body 2, and an attachment 4 attached to the upper slewing body 3.

The attachment 4 includes a boom 5 having a base end section rotatably attached to the upper slewing body 3, an arm 6 having a base end section rotatably attached to a distal end section of the boom 5, and a bucket 7 rotatably attached to a distal end section of the arm 6.

In addition, the attachment 4 includes a boom cylinder 8 which rotationally drives the boom 5 with respect to the upper slewing body 3, an arm cylinder 9 which rotationally drives the arm 6 with respect to the boom 5, and a bucket cylinder 10 which rotationally drives the bucket 7 with respect to the arm 6.

Figure 2:
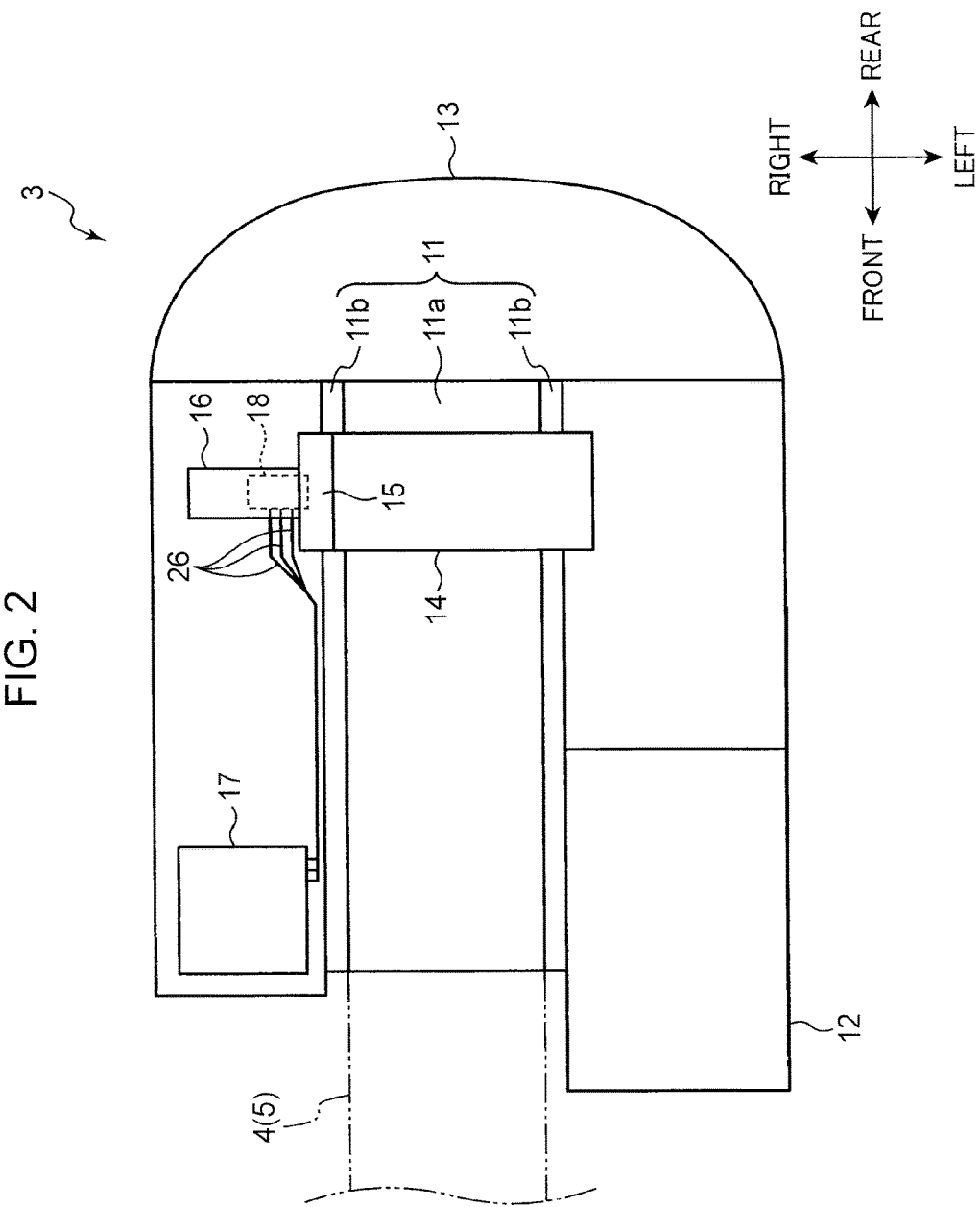
FIG. 2 is a plan view of an upper slewing body shown in FIG. 1 from which a panel covering a configuration on an upper frame is omitted.

Referring to FIGS. 1 and 2, the upper slewing body 3 includes an upper frame 11 provided on the lower traveling body 2, and a cab 12, a counterweight 13, an engine 14, a generator motor 15, a hydraulic pump 16, and an inverter 17 which are respectively provided on the upper frame 11. Hereinafter, directions as viewed by an operator seated on a driver's seat in the cab 12 will be used. Moreover, in FIG.

2, a panel which covers the configuration provided on the upper frame 11 from above is omitted.

Figure 3:
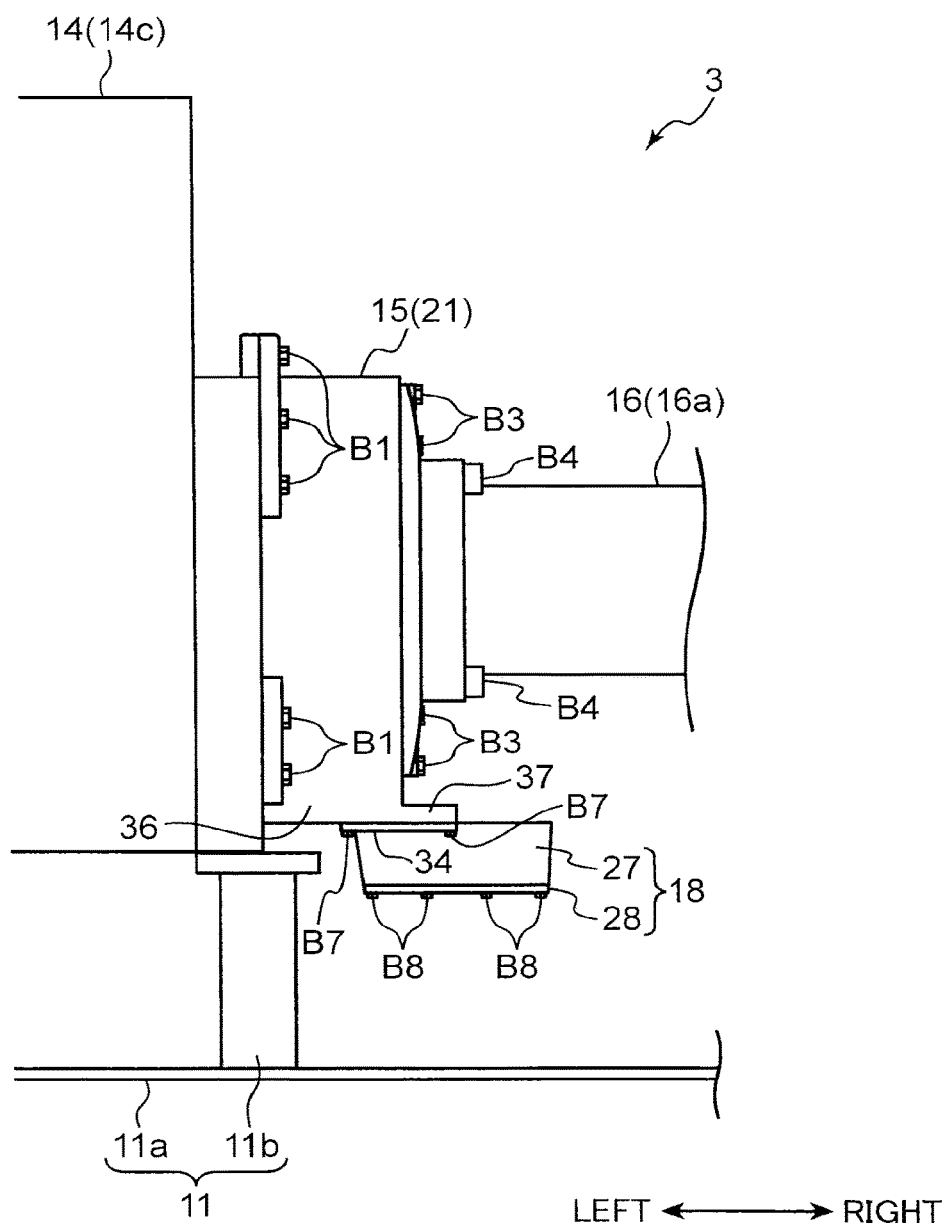
FIG. 3 is a rear view of the upper slewing body shown in FIG. 2 as viewed from behind from which a counterweight is omitted.

Referring to FIGS. 2 and 3, the upper frame 11 includes a bottom plate 11a rotatably provided on the lower traveling body 2 and a pair of supporting frames 11b standing on the bottom plate 11a. Each of the supporting frames 11b includes vertical plates (not assigned a reference numeral) which extend from a front portion to a rear portion of the bottom plate 11a and which oppose each other in a left-right direction and a back plate (not assigned a reference numeral) which is welded to upper end surfaces of the vertical plates.

The cab 12 is provided on a left side of the left-side supporting frame 11b and in a front portion of the bottom plate 11a.

The counterweight 13 is provided in a rear portion of the bottom plate 11a approximately across an entire region in the left-right direction of the bottom plate 11a.

The engine 14 is provided in front of the counterweight 13 and is supported on the bottom plate 11a by the pair of supporting frames 11b. Specifically, the engine 14 is arranged so as to bridge both supporting frames 11b in a state where an axial line J1 (refer to FIG. 4) of an output shaft 14a of the engine 14 is oriented in the left-right direction.

Figure 4:
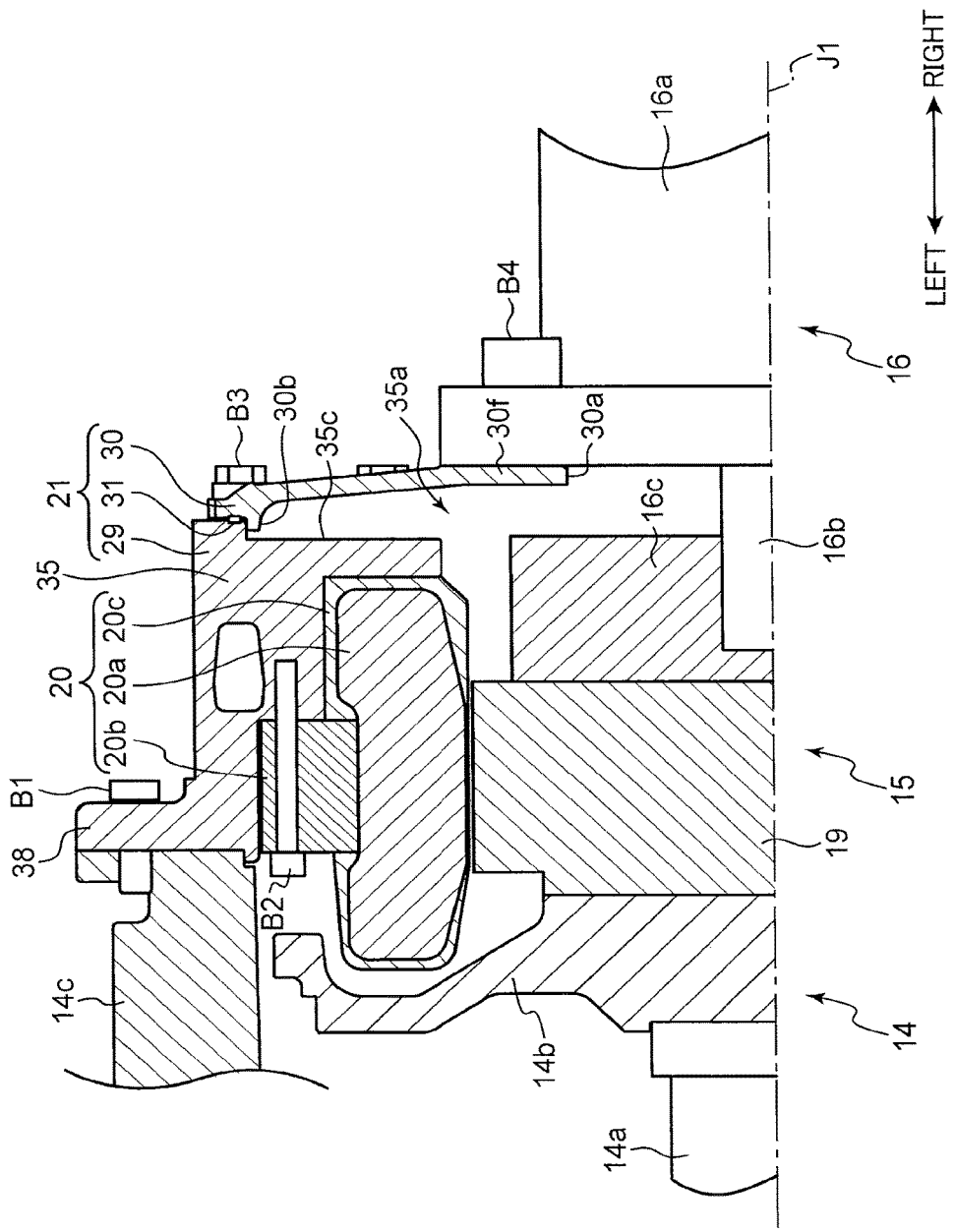
FIG. 4 is a sectional view of upper portions of an engine and a generator motor from the perspective shown in FIG. 3 from which parts of the engine and a hydraulic pump are omitted.

In addition, as shown in FIG. 4, the engine 14 includes a flywheel 14b connected to an end section of the output shaft 14a and an engine housing 14c which encloses the output shaft 14a and the flywheel 14b around the axial line J1 thereof.

The generator motor 15 and the hydraulic pump 16 are connected in series to the engine 14 so that respective driving shafts thereof are consistent with the axial line J1 of the engine 14. Specifically, the engine 14, the generator motor 15, and the hydraulic pump 16 are arranged in this order from one side (a left side) toward another side (a right side) of the axial line J1.

Figure 5:
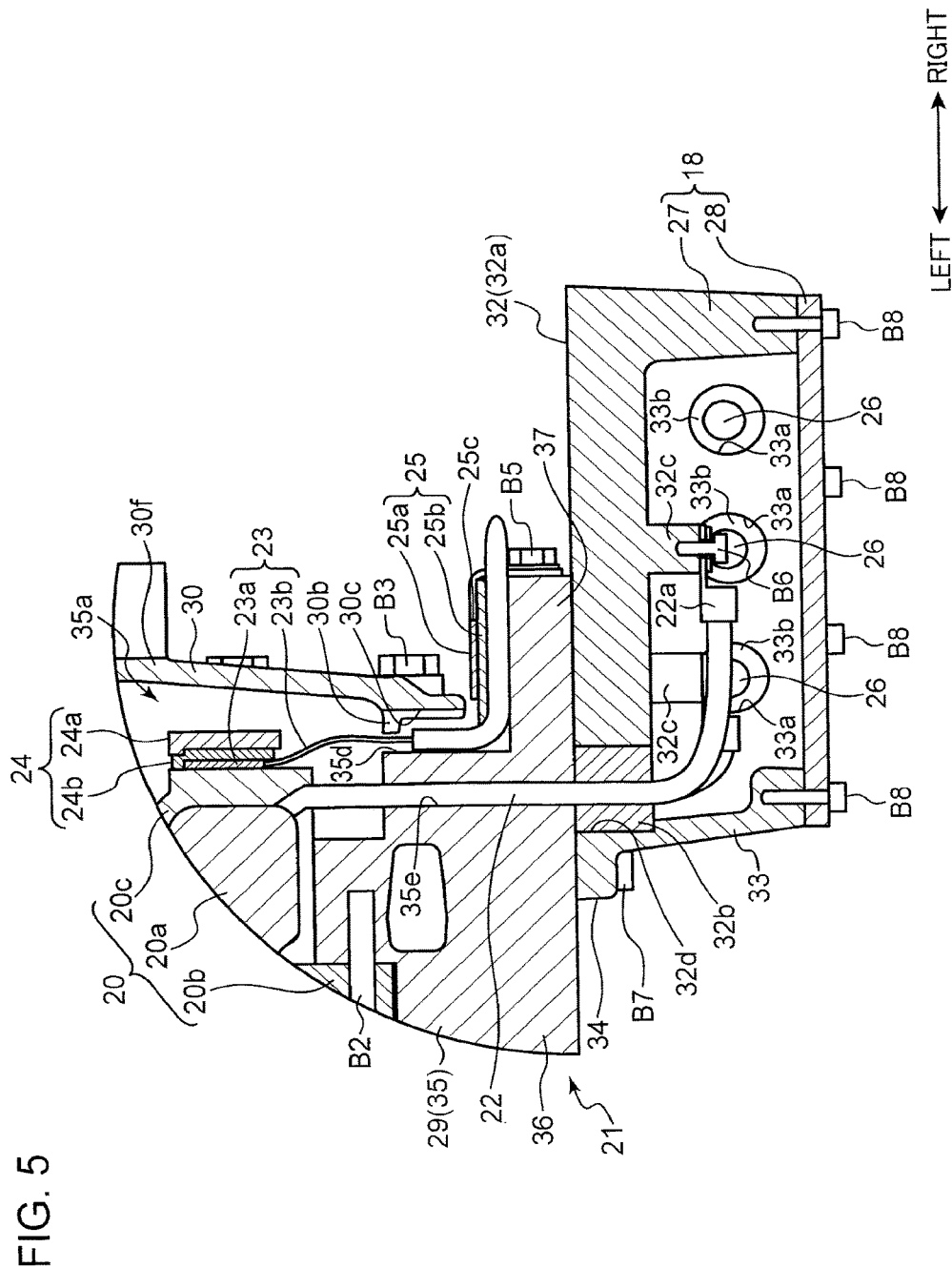
FIG. 5 is a sectional view of a lower portion of a generator motor from the perspective shown in FIG. 3.

Referring to FIGS. 4 and 5, the generator motor 15 includes: a stator 20; a rotor 19 which rotates relative to the stator 20; a motor housing (a housing) 21 which houses the stator 20 and the rotor 19; three cables 22 (only two are shown in FIG. 5) which are electrically connected to the stator 20; a temperature sensor 23 provided in the motor housing 21; and a first pressing mechanism 24 and a second pressing mechanism 25 which press the temperature sensor 23 against the motor housing 21.

The stator 20 includes a coil section 20a, a supporting section 20b which supports the coil section 20a, and a mold resin 20c provided around one part of the supporting section 20b and around the coil section 20a so as to seal the coil section 20a. An end section on an inner side (an end section on a side closer to the axial line J1) of the supporting section 20b is fixed to the coil section 20a, and an end section on an outer side of the supporting section 20b is fixed by a bolt B2 to a housing main body 29 (to be described later) of the motor housing 21.

The rotor 19 is connected to the output shaft 14a of the engine 14 via the flywheel 14b so as to be rotatable around the axial line J1.

The motor housing 21 includes the housing main body 29 which encloses a periphery of the stator 20 and the rotor 19, a cover 30 which is attached to a right-side end surface of the housing main body 29 so as to cover an opening 35a formed on an end surface on an opposite side to the engine 14 (a right side) of the housing main body 29, a seal member 31 provided between the housing main body 29 and the cover 30, and a terminal box 18 attached to the housing main body 29.

The housing main body 29 includes a peripheral wall section 35 provided on an entire circumference around the axial line J1 and an attached section 38 provided in an end section on a side of the engine 14 (a left side) of the peripheral wall section 35. By attaching the attached section 38 to a right end section of the engine housing 14c by a bolt B1, the housing main body 29 (the generator motor 15) is attached to the engine 14.

Figure 7:
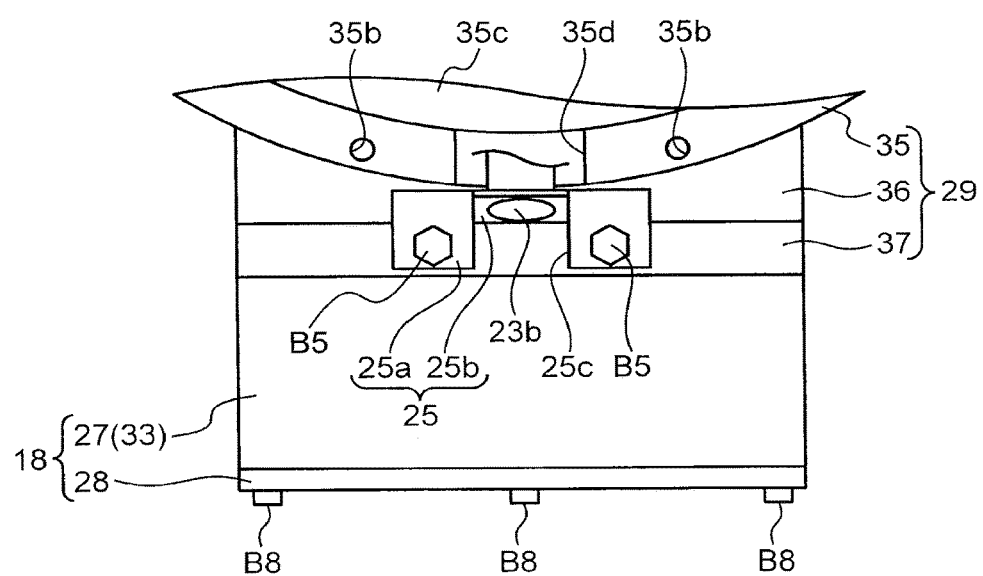
FIG. 7 is a side view showing a housing main body from which a cover has been detached.

The peripheral wall section 35 will be described with reference to FIGS. 4, 5, and 7. Moreover, FIG. 7 is a diagram of the housing main body 29 as viewed from a right side and which omits the cover 30.

The peripheral wall section 35 encloses the stator 20 and the rotor 19 around the axial line J1. In addition, the peripheral wall section 35 includes a plurality of female screw sections 35b (only two are shown in FIG. 7) provided on an outer peripheral edge of a right end surface of the peripheral wall section 35 and a recessed section 35c formed in a region on an inner side of the plurality of female screw sections 35b on the right end surface of the peripheral wall section 35. The recessed section 35c defines an opening 35a on the housing main body 29.

The cover 30 will be described with reference to FIGS. 4 to 6. Moreover, FIG. 6 is a diagram of the cover 30 as viewed from a left side and which omits the housing main body 29.

The cover 30 is attached to a right end surface of the peripheral wall section 35 in a state where the cover 30 is fitted into the recessed section 35c of the peripheral wall section 35. Specifically, the cover 30 includes a plate-like cover main body 30f, a plurality of through-holes 30a provided on an outer peripheral edge of the cover main body 30f, and an annular protrusion 30b which protrudes leftward from the cover main body 30f on an inner side of the through-holes 30a. By screwing a bolt B3 inserted into each through-hole 30a to the female screw section 35b of the peripheral wall section 35 in a state where the annular protrusion 30b is fitted into the recessed section 35c of the peripheral wall section 35, the cover 30 is detachably attached to the right end surface of the peripheral wall section 35.

Figure 6:
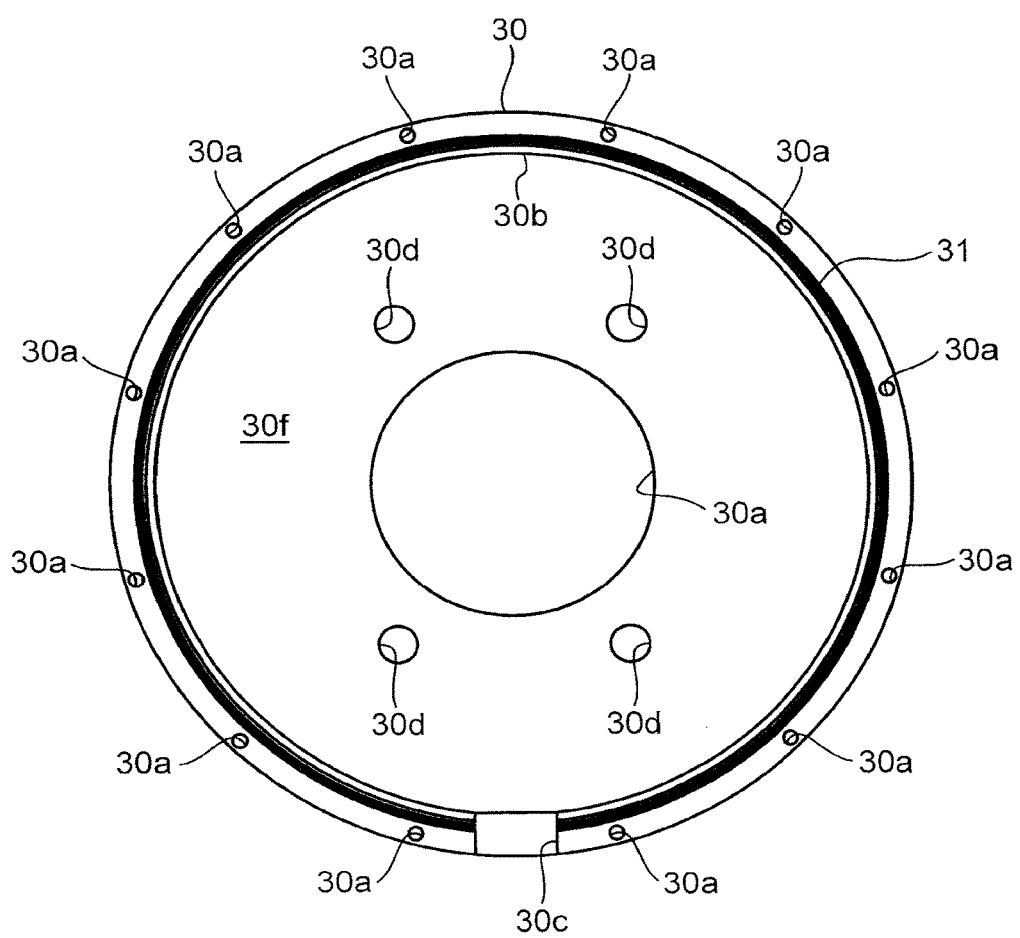
FIG. 6 is a plan view showing a cover which has been detached from a housing main body.

The seal member 31 is provided on an outer side of the annular protrusion 30b of the cover 30 and on an inner side of the plurality of through-holes 30a as shown in FIG. 6 in a region other than a drain groove 30c (to be described later) in a peripheral direction centered on the axial line J1. A flow of water passing between the housing main body 29 and the cover 30 is restricted due to the seal member 31 being sandwiched between the cover 30 and the housing main body 29. Accordingly, water can be prevented from entering into the inside of the motor housing 21 from the outside of the motor housing 21 through a space between the housing main body 29 and the cover 30.

Meanwhile, since the rotor 19 and the stator 20 generate heat during activation of the generator motor 15, dew condensation may occur inside the motor housing 21 when a temperature difference between the inside of the motor housing 21 and the outside of the motor housing 21 increases, and water created by the dew condensation may adversely affect the generator motor 15. In particular, since the generator motor 15 is cooled by the circulation of a coolant through a coolant passage (refer to FIGS. 4 and 5; not assigned a reference numeral) formed in the peripheral wall section 35 of the housing main body 29, the temperature difference tends to increase.

In consideration thereof, a drain hole for draining water inside the motor housing 21 to below the motor housing 21 is formed between a lower end of the cover 30 and an end surface on an opposite side to the engine 14 (a right side) of the housing main body 29.

Specifically, as shown in FIGS. 5 to 7, a drain groove 35d is formed on an outer peripheral edge of a right end surface of the peripheral wall section 35 of the housing main body 29. The drain groove 35d is provided in a lower portion of the peripheral wall section 35 and has a bottom surface which is arranged further leftward than portions other than the drain groove 35d on the outer peripheral edge of the right end surface of the peripheral wall section 35.

Meanwhile, a drain groove 30c is formed on a lower end of an outer peripheral edge of a left side surface of the cover main body 30f. The drain groove 30c has a bottom surface which is arranged further rightward than portions other than the drain groove 30c on the outer peripheral edge of the left side surface of the cover main body 30f.

By fixing the cover 30 to the peripheral wall section 35, both drain grooves 30c and 35d oppose each other and a drain hole is formed between both drain grooves 30c and 35d. The drain hole enables water inside the motor housing 21 to be guided to below the motor housing 21.

However, the drain hole connects the inside of the motor housing 21 and the outside of the motor housing 21 to each other and does not restrict penetration of water from the outside of the motor housing 21 to the inside of the motor housing 21.

In consideration thereof, as shown in FIGS. 5 and 7, the housing main body 29 includes a protruded section 36 which protrudes downward from a lower end section of the peripheral wall section 35 and a covered section 37 which extends toward an opposite side to the engine 14 (a right side) from a lower end section of the protruded section 36.

The covered section 37 covers the drain hole from below at a position that is lower than the drain hole. Specifically, the covered section 37 extends to a position further towards an opposite side to the engine 14 (a right side) than an end surface (a right-side end surface) to which the cover 30 of the housing main body 29 is attached. Accordingly, water can be prevented from entering into the motor housing 21 from below through the drain hole.

In addition, the drain hole is also used to run a conducting wire 23b of the temperature sensor 23.

Specifically, the temperature sensor 23 includes a temperature detector 23a provided inside the motor housing 21 and the conducting wire 23b which extends from the temperature detector 23a to the outside of the motor housing 21 through the drain hole in order to send a detection signal by the temperature detector 23a to the outside of the motor housing 21. The temperature detector 23a is attached to a right end surface of the mold resin 20c of the stator 20 by the first pressing mechanism 24. The conducting wire 23b includes a conducting section (not shown) made of conductive metal and a covered section (not assigned a reference numeral) which covers the conducting section. The covered section prevents water from coming into contact with the conducting section.

The first pressing mechanism 24 includes a pressing plate 24a which presses the temperature detector 23a against the mold resin 20c and a shock absorbing material 24b provided between the pressing plate 24a and the temperature detector 23a. The pressing plate 24a is fixed to the stator 20 by a bolt (not shown).

Meanwhile, the conducting wire 23b is attached on an outer side of the motor housing 21 to an upper surface of the covered section 37 of the housing main body 29 by the second pressing mechanism 25.

The second pressing mechanism 25 includes a pressing plate 25a which presses the conducting wire 23b against the covered section 37 and a shock absorbing material 25b provided between the pressing plate 25a and the conducting wire 23b. The pressing plate 25a includes an upper surface arrangement section (not assigned a reference numeral) which is arranged along the upper surface of the covered section 37 and a side surface arrangement section (not assigned a reference numeral) which is arranged along a right side surface of the covered section 37, and the side surface arrangement section is fixed to the right end surface of the covered section 37 by a bolt B5. In addition, a slit 25c is formed on the pressing plate 25a from the upper surface arrangement section to the side surface arrangement section, and the conducting wire 23b is arranged through the slit 25c.

Furthermore, the terminal box 18 is attached to a lower surface of the covered section 37.

The terminal box 18 includes three terminals 22a (terminals connected to three cables 22) which are electrically connected to the stator 20 and which allow three cables 26 (refer to FIG. 2) to be connected and a box main body (a main body section 27 and a lid section 28) which houses the terminals 22a.

The cable 22 is arranged from the inside of the motor housing 21 to the outside of the motor housing 21 through a through-hole 35e formed in a lower portion of the housing main body 29 of the generator motor 15. An end section of the cable 22 on an inner side of the motor housing 21 is connected to the stator 20. Meanwhile, an end section of the cable 22 (the terminal 22a) on an outer side of the motor housing 21 is held by the main body section 27 of the terminal box 18.

The main body section 27 includes a top plate 32, a peripheral wall 33 which extends downward from an outer peripheral edge of the top plate 32, and an attached section 34 which extends forward and rearward from the top plate 32 and which is attached to a lower surface of the housing main body 29 by a bolt B7. The attached section 34 is attached to lower surfaces of the protruded section 36 and the covered section 37 of the housing main body 29 (refer to FIG. 3).

The top plate 32 includes a top plate main body 32a which is approximately rectangular in a plan view, a grommet 32b provided in a through-hole 32d which penetrates the top plate main body 32a in a vertical direction, and three terminal holding sections 32c (only two are shown in FIG. 5 due to a position of a cross section) which protrude downward from a lower surface of the top plate main body 32a. The three cables 22 are arranged from top of the top plate main body 32a to bottom of the top plate main body 32a through the through-hole 32d and the grommet 32b in a state where the cables 22 are lined up in a front-rear direction.

The terminal holding sections 32c hold the terminals 22a of the three cables 22 in a state where the terminals 22a are arranged on a surface (hereinafter, referred to as a first surface) that is parallel to the bottom plate 11a (refer to FIG. 3). Specifically, the terminal holding sections 32c include a female screw hole into which a bolt B6 can be screwed and hold the terminals 22a by sandwiching the terminals 22a of the cables 22 and the terminals of the cables 26 between a head of the bolt B6 and a lower surface of the terminal holding sections 32c.

Moreover, the three terminal holding sections 32c (only two are shown in FIG. 5 due to a position of a cross section)

are arranged at positions which differ from one another in a left-right direction and which differ from one another in a front-rear direction.

The peripheral wall 33 has a shape which encloses the three terminal holding sections 32c and end sections of the cables 22 and 26 connected to the terminal holding sections 32c over an entire circumference around an axis in a vertical direction. Specifically, the peripheral wall 33 includes a right wall and a left wall which are arranged in a front-rear direction and a front wall and a rear wall (the rear wall is not shown) which are arranged in a left-right direction. The front wall includes a through-hole 33a which penetrates the front wall in a front-rear direction in order to run two cables 26 and a grommet 33b provided inside the through-hole 33a. The through-hole 33a is arranged on the first surface on which the terminals 22a of the three cables 22 are arranged.

The cables 26 are arranged through the through-hole 33a and the grommet 33b from an outer side of the front wall (a front side) to an inner side of the front wall (a rear side) along the first surface. Front end sections of the cables 26 are connected to the inverter 17 (refer to FIG. 2).

The inverter 17 controls operations of the generator motor 15 so that the generator motor 15 operates as a generator due to power from the engine 14 and the generator motor 15 operates as an electric motor due to electric power from an electric power source (not shown; an electric power storage device or the like). Specifically, the inverter 17 is electrically connected to the terminal box 18 via the cables 26, supplies electric power from an electric power source (not shown) to the generator motor 15 via the cables 26 and, at the same time, supplies electric power supplied from the generator motor 15 via the cables 26 to the electric power source.

In addition, as shown in FIG. 2, the inverter 17 is arranged on a right side of the right-side supporting frame 11b or, in other words, the same side as the terminal box 18 in front of the terminal box 18. Therefore, the cables 26 are arranged between the inverter 17 and the terminal box 18 without exceeding or penetrating the supporting frames 11b.

Referring to FIGS. 5 and 7, the peripheral wall 33 of the terminal box 18 includes an opening (not assigned a reference numeral) which opens the terminal holding sections 32c and the terminals of the cables 22 and 26 held by the terminal holding sections 32c to below. The lid section 28 is detachably attached to a lower end section of the peripheral wall 33 by a bolt B3 so as to block the opening of the peripheral wall 33.

Referring to FIGS. 3, 4, and 6, the hydraulic pump 16 is attached to the cover 30 of the motor housing 21.

The hydraulic pump 16 supplies operating oil to a hydraulic actuator (for example, cylinders 8 to 10 [refer to FIG. 1] and a traveling motor and a rotating motor [both not shown]) to operate the hydraulic actuator.

Specifically, the hydraulic pump 16 includes a pump main body 16a attached to a right side surface of the cover 30 of the motor housing 21 and a driving shaft 16b extending leftward from the pump main body 16a. The pump main body 16a is attached to the cover 30 by a bolt B4 that is screwed to a female screw section 30d (refer to FIG. 6) formed on the cover 30. In other words, the female screw section 30d corresponds to the pump attaching section which allows the hydraulic pump 16 to be attached. Moreover, a seal member (not shown) is provided between the pump main body 16a and the cover 30, and movement of water between the pump main body 16a and the cover 30 is prevented by the seal member. The driving shaft 16b extends into the peripheral wall section 35 of the generator motor 15 through the through-hole 30a formed on the cover 30 and is connected to the rotor 19 via a coupling 16c.

Due to the hydraulic pump 16 being attached to the cover 30, the hydraulic pump 16 can be detached from the housing main body 29 by detaching the cover 30 from the housing main body 29. In this case, since the conducting wire 23b of the temperature sensor 23 is arranged between the cover 30 and the housing main body 29, an operation for detaching the conducting wire 23b from the cover 30 is not required.

As described above, a drain hole (the drain grooves 30c and 35d) is formed between the lower end of the cover 30 and the right end surface of the housing main body 29 and, at the same time, the covered section 37 is provided below the drain hole. Accordingly, water inside the motor housing 21 travels along the inner surface of the cover 30 and the right end surface of the housing main body 29 to enter the drain hole, passes between the drain hole and the covered section 37 provided at a position lower than the drain hole, and is guided to the outside of the motor housing 21.

Therefore, water inside the motor housing 21 can be drained to the outside of the motor housing 21.

In addition, due to the covered section 37 covering the drain hole from below, since the covered section 37 functions as a barrier even when water approaches the motor housing 21 from below (for example, during washing of the construction machine using a high-pressure washer), water can be prevented from entering into the motor housing 21 from the outside of the motor housing 21 through the drain hole.

Furthermore, the first embodiment also achieves the following effects.

Since the covered section 37 can be constructed using a part of the housing main body 29, cost can be reduced as compared to a case where a separate member is provided as the covered section 37.

The terminal box 18 can be arranged using a dead space formed below the generator motor 15. In addition, the terminal box 18 can be attached in a reliable manner by using, as an attachment surface of the terminal box 18, the lower surface of the covered section 37 extending in order to cover the drain hole as described above.

As described above, the conducting wire 23b of the temperature sensor 23 can be guided to the outside of the motor housing 21 using the drain hole while using the covered section 37 to prevent water from entering into the motor housing 21 through the drain hole.

Therefore, unlike a case where the conducting wire 23b penetrates the cover 30, since waterproofing means between the conducting wire 23b and the cover 30 can be omitted, an advantage is gained in terms of cost.

Since the cover 30 is attachable and detachable with respect to the housing main body 29, an operation for opening the opening 35a of the housing main body 29 and an operation for detaching the hydraulic pump 16 from the generator motor 15 can be performed at the same time during maintenance of the generator motor 15.

When the conducting wire 23b of the temperature sensor 23 is arranged so as to penetrate the cover 30 as described above, means for preventing water from entering between the cover 30 and the conducting wire 23b must be adjusted each time the cover 30 is attached or detached. In contrast, adopting the aspect described above in a state where the conducting wire 23b is arranged through the drain hole eliminates the need to adjust the means for preventing water from entering and makes maintenance of the generator motor easier.

Figure 8:
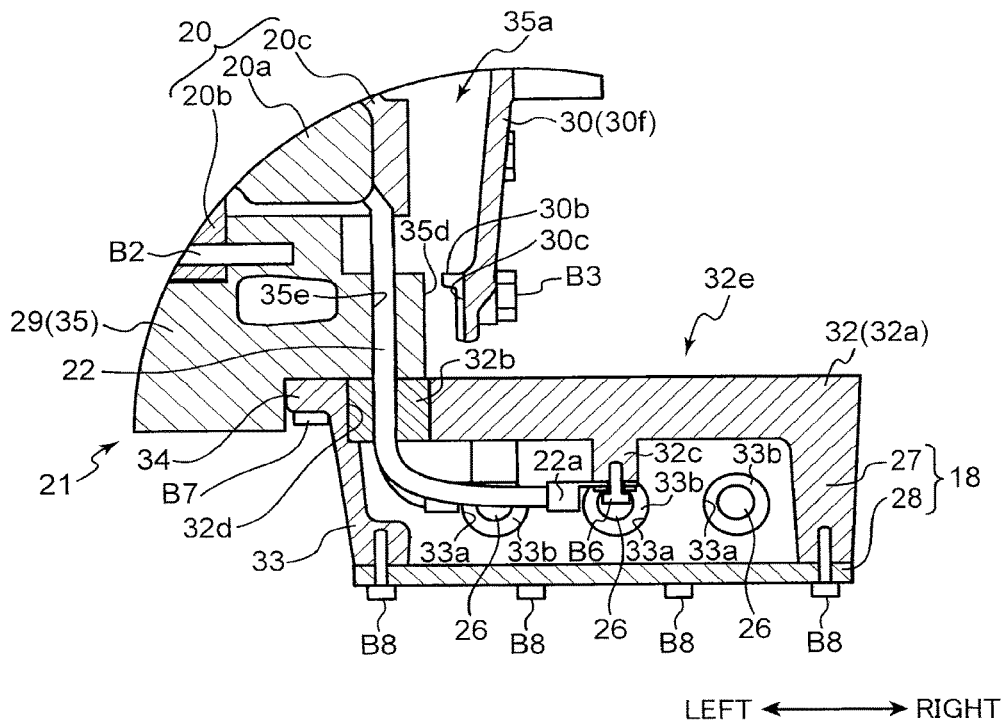
FIG. 8 is a diagram corresponding to FIG. 5 of a generator motor according to a second embodiment of the present invention.

Second Embodiment (FIG. 8)

In the first embodiment, a part of the housing main body 29 constitutes the covered section 37 which covers the drain hole from below. Alternatively, members other than the housing main body 29 and the cover 30 of the motor housing 21 can be used as the covered section.

Specifically, in the housing main body 29 according to the second embodiment shown in FIG. 8, the protruded section 36 and the covered section 37 (refer to FIG. 7) according to the first embodiment are omitted and, at the same time, the terminal box 18 is directly attached to the lower surface of the housing main body 29.

A part of a box main body (the main body section 27 and the lid section 28) of the terminal box 18 which extends to a position further toward an opposite side to the engine 14 (a right side) than a right end surface of the housing main body 29 corresponds to a covered section 32e which covers a drain hole at a position below the drain hole from below. Water can be prevented by the covered section 32e from entering into the motor housing 21 from below the motor housing 21 through the drain hole.

Moreover, while a part of the box main body of the terminal box 18 is used as the covered section in the second embodiment, alternatively, the entire box main body can be arranged at the right end surface of the housing main body 29 and on a right side thereof and the entire box main body can be used as the covered section.

Figure 9:
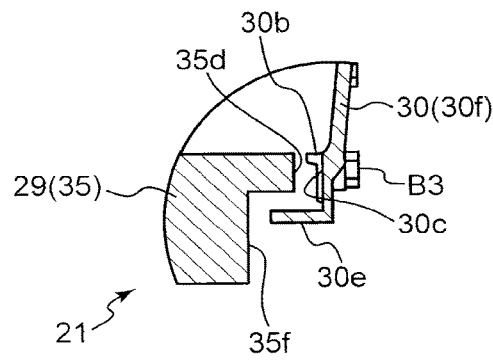
FIG. 9 is a sectional view showing an enlargement of a drain hole of a generator motor according to a third embodiment of the present invention.

Third Embodiment (FIG. 9)

While the housing main body 29 or the box main body of the terminal box 18 is used as the covered section in the embodiment described above, alternatively, a part of the cover 30 can be used as the covered section.

In the third embodiment shown in FIG. 9, a recessed section 35f is formed below the drain hole (the drain grooves 30c and 35b) in a right end section of the housing main body 29. The recessed section 35f has a bottom surface which is arranged further toward the side of the engine (a left side) than an end surface on an opposite side to the engine (a right side) of the housing main body 29.

Meanwhile, the cover 30 includes a covered section 30e which extends from a lower end of the cover 30 into the recessed section 35f. The covered section 30e covers the drain hole from below at a position that is lower than the drain hole. Water can be prevented by the covered section 30e from entering into the motor housing 21 from below the motor housing 21 through the drain hole.

Moreover, the present invention is not limited to the embodiments described above and, for example, the following aspects can also be adopted.

While drain grooves 30c and 35d are formed on both the housing main body 29 and the cover 30 in order to form a drain hole, a groove need only be formed on at least one of the housing main body 29 and the cover 30.

While an example in which the output shaft 14a of the engine 14 is arranged in a left-right direction has been described, an arrangement of the engine 14 is not limited thereto on the premise that the output shaft 14a of the engine 14 is arranged in a horizontal direction. For example, the engine 14 can be arranged so that the output shaft 14a is oriented in the front-rear direction. In this case, arrangements of the generator motor 15 and the hydraulic pump 16 can also be appropriately adjusted in accordance with an orientation of the output shaft 14a.

While an example provided with where three terminals 22a of the cables 22 has been described, the number of the terminals 22a is not limited thereto. At least one terminal 22a need only be provided.

In addition, the construction machine is not limited to a shovel and may be a crane or a dismantling machine.

The specific embodiments described above mainly include an invention configured as described below.

Specifically, the present invention provides a generator motor to be attached to an engine of a construction machine, the generator motor including: a stator; a rotor that rotates relative to the stator; and a housing that houses the stator and the rotor, wherein the housing includes a housing main body that encloses a periphery of the stator and the rotor and a cover that is attached to an end surface of the housing main body so as to cover an opening formed on the end surface, which is on an opposite side to the engine, of the housing main body, a drain hole for draining water inside the housing to below the housing is formed between a lower end of the cover and the end surface of the housing main body, and the housing includes a covered section that covers the drain hole from below at a position lower than the drain hole.

According to the present invention, a drain hole is formed between the lower end of the cover and the end surface of the housing main body and, at the same time, a covered section is provided below the drain hole. Accordingly, water inside the housing travels along the inner surface of the cover and the end surface of the housing main body to enter the drain hole, passes between the drain hole and the covered section provided at a position lower than the drain hole, and is guided to the outside of the housing.

Therefore, according to the present invention, water inside the housing can be drained to the outside of the housing.

Furthermore, in the present invention, due to the covered section covering the drain hole from below, since the covered section functions as a barrier even when water approaches the housing from below (for example, during washing of the construction machine using a high-pressure washer), water can be prevented from entering into the housing from the outside through the drain hole.

Moreover, the terms "lower end" and "below" in the present invention are based on a downward direction in a state where the generator motor is attached to an engine having an output shaft arranged approximately horizontally.

While the covered section may be constituted by a separate member from the housing main body and the cover, such a configuration results in increased cost.

In consideration thereof, favorably, in the generator motor, the covered section is constituted by a part of the housing main body that extends to a position further toward an opposite side to the engine than the end surface of the housing main body.

According to this aspect, since the covered section can be constructed using a part of the housing main body, cost can be reduced as compared to a case where a separate member is provided as the covered section.

The housing may be further provided with a terminal box that includes a terminal electrically connected to the stator and allowing a cable to be connected, and a box main body which houses the terminal.

In this case, while the terminal box may be attached to any position of the housing main body, spaces around the housing main body in a plan view and above the housing main body in a construction machine are restricted due to relationships with other devices. Therefore, it is difficult to arrange the terminal box in these spaces.

In consideration thereof, favorably, the terminal box is attached to a lower surface of the covered section.

According to this aspect, the terminal box can be arranged using a dead space formed below the generator motor. Furthermore, the terminal box can be attached in a reliable manner by using, as an attachment surface of the terminal box, the lower surface of the covered section having been extended in order to cover the drain hole as described above.

Meanwhile, the housing may be further provided with a terminal box that includes a terminal electrically connected to the stator and allowing a cable to be connected, and a box main body housing the terminal and attached to the housing main body, wherein the covered section may be constituted by at least a part of the box main body extending to a position further toward an opposite side to the engine than the end surface of the housing main body.

Even according to this aspect, since the drain hole can be covered using a part of a component (the terminal box) required by the generator motor, cost can be reduced as compared to a case where a member solely designed to cover the drain hole is separately provided.

There may be cases where an operation of the generator motor is controlled using the temperature inside the housing in order to avoid a decline in efficiency of the generator motor and to avoid damages to the generator motor. In such a case, a temperature detector is provided inside the housing and a detection signal of the temperature detector is sent to the outside of the housing by a conducting wire.

In this case, although the conducting wire can be arranged so that the conducting wire penetrates the cover, such arranging necessitates providing means for preventing entering of water from the outside of the cover between the cover and the conducting wire.

In consideration thereof, favorably, the generator motor further includes a temperature detector that is provided inside the housing and a conducting wire that extends from the temperature detector to the outside of the housing through the drain hole in order to send a detection signal of the temperature detector to the outside of the housing.

According to this aspect, the conducting wire can be guided to the outside of the housing using the drain hole while using the covered section to prevent water from entering into the housing through the drain hole.

Therefore, according to the aspect, unlike a case where the conducting wire penetrates the cover, since waterproofing means between the conducting wire and the cover can be omitted, an advantage is gained in terms of cost.

In the generator motor, favorably, the cover is detachably attached to the housing main body and further includes a pump attaching section that allows a hydraulic pump to be attached, the hydraulic pump being provided in the construction machine.

According to this aspect, since the cover is attachable and detachable with respect to the housing main body, an operation for opening an opening of the housing main body and an operation for detaching the hydraulic pump from the generator motor can be performed at the same time during maintenance of the generator motor.

When the conducting wire connected to the temperature detector is arranged so as to penetrate the cover as described above, means for preventing water from entering between the cover and the conducting wire must be adjusted each time the cover is attached or detached. In contrast, adopting the aspect described above in a state where the conducting wire is arranged through the drain hole eliminates the need to adjust the means for preventing water from entering and makes maintenance of the generator motor easier.

This application is based on Japanese Patent application No. 2015-084246 filed in Japan Patent Office on Apr. 16, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A generator motor to be attached to an engine of a construction machine, the generator motor comprising:
   a stator;
   a rotor that rotates relative to the stator; and
   a housing that houses the stator and the rotor, wherein
   the housing includes a housing main body that encloses a periphery of the stator and the rotor and a cover that is attached to an end surface of the housing main body so as to cover an opening formed on the end surface, which is on an opposite side to the engine, of the housing main body,
   a drain hole, extending in a direction perpendicular to an axial line of the rotor, for draining water inside the housing in the direction perpendicular to the axial line of the rotor from the housing is formed between a lower end of the cover and the end surface of the housing main body,
   the housing includes a covered section that covers the drain hole from outside of the drain hole in the direction perpendicular to the axial line, the covered section being constituted by a part of the housing main body that extends to a position further toward an opposite side to the engine than the end surface of the housing main body,
   the housing is further provided with a terminal box that includes a terminal electrically connected to the stator and allowing a cable to be connected, and a box main body housing the terminal, and
   the terminal box is attached to a surface of the covered section, the surface facing to the outside in the direction perpendicular to the axial line.

2. The generator motor according to claim 1, wherein the cover is detachably attached to the housing main body and further includes a pump attaching section that allows a hydraulic pump to be attached, the hydraulic pump being provided in the construction machine.

3. A generator motor to be attached to an engine of a construction machine, the generator motor comprising:
   a stator;
   a rotor that rotates relative to the stator; and
   a housing that houses the stator and the rotor, wherein
   the housing includes a housing main body that encloses a periphery of the stator and the rotor and a cover that is attached to an end surface of the housing main body so as to cover an opening formed on the end surface, which is on an opposite side to the engine, of the housing main body,
   a drain hole for draining water inside the housing to below the housing is formed between a lower end of the cover and the end surface of the housing main body,
   the housing includes a covered section that covers the drain hole from the drain hole, and
   the generator motor comprises a temperature detector that is provided inside the housing; and a conducting wire that extends from the temperature detector to the outside of the housing through the drain hole in order to send a detection signal of the temperature detector to the outside of the housing.

* * * * *